US011429602B2

(12) United States Patent
Kvochko et al.

(10) Patent No.: US 11,429,602 B2
(45) Date of Patent: *Aug. 30, 2022

(54) MULTI-DIMENSIONAL MODELING OF RESOURCE INTERACTION PROCESSORS

(71) Applicant: BANK OF AMERICA CORPORATION, Charlotte, NC (US)

(72) Inventors: Elena Kvochko, New York, NY (US); Manu Jacob Kurian, Dallas, TX (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 315 days.

This patent is subject to a terminal disclaimer.

(21) Appl. No.: 16/751,591

(22) Filed: Jan. 24, 2020

(65) Prior Publication Data
US 2021/0232574 A1 Jul. 29, 2021

(51) Int. Cl.
G06F 16/20 (2019.01)
G06F 16/242 (2019.01)
H04L 9/06 (2006.01)
G06N 5/00 (2006.01)
H04L 9/00 (2022.01)

(52) U.S. Cl.
CPC ......... G06F 16/244 (2019.01); G06N 5/003 (2013.01); H04L 9/0637 (2013.01); H04L 9/50 (2022.05)

(58) Field of Classification Search
CPC ...... G06F 16/244; G06N 5/003; H04L 9/0637
See application file for complete search history.

(56) References Cited

U.S. PATENT DOCUMENTS

| 7,620,592 | B2 | 11/2009 | OMara et al. |
| 7,930,753 | B2 | 4/2011 | Mellinger et al. |
| 8,027,912 | B1 | 9/2011 | Thomas |
| 8,175,908 | B1 | 5/2012 | Anderson |
| 8,429,060 | B2 | 4/2013 | Deckoff |
| 8,626,663 | B2 * | 1/2014 | Nightengale ......... G06Q 20/40 705/77 |
| 9,367,844 | B1 | 6/2016 | Hu et al. |
| 2010/0076987 | A1 * | 3/2010 | Schreiner ............... G06Q 30/06 707/754 |
| 2011/0191832 | A1 * | 8/2011 | Davis .................... H04L 63/105 709/206 |
| 2016/0034898 | A1 | 2/2016 | Ghosh |
| 2016/0260102 | A1 | 9/2016 | Nightengale et al. |
| 2016/0267406 | A1 | 9/2016 | Bodo et al. |
| 2017/0169252 | A1 * | 6/2017 | Ukena-Bonfig ...... H04W 12/02 |
| 2019/0012670 | A1 * | 1/2019 | Pishe ................... G06Q 20/425 |
| 2019/0087822 | A1 | 3/2019 | Vasu et al. |
| 2019/0306173 | A1 * | 10/2019 | Reddy ................... H04L 9/0637 |
| 2020/0117690 | A1 * | 4/2020 | Tran .................. G06F 16/90332 |

(Continued)

Primary Examiner — Tarek Chbouki
(74) Attorney, Agent, or Firm — Moore & Van Allen PLLC; James C. Edwards

(57) ABSTRACT

A system that provides for multi-dimensional modeling of resource interaction processors for determining viability of deployment of resource interaction services. The system leverages data captured from various sources along with internal and external rules and regulations applicable to a resource interaction processor to determine whether the resource interaction processor meets requirements for resource interactions services. In the event that the resource interaction processor is determined to be viable, resource interactions services are deployed to the resource interaction processor.

16 Claims, 7 Drawing Sheets

(56) References Cited

U.S. PATENT DOCUMENTS

| | | | |
|---|---|---|---|
| 2020/0396065 A1* | 12/2020 | Gutierrez-Sheris | ........................... H04L 9/3297 |
| 2021/0192541 A1* | 6/2021 | Black | .................... H04L 9/3239 |
| 2021/0192651 A1* | 6/2021 | Groth | ..................... G06N 20/20 |
| 2021/0366586 A1* | 11/2021 | Ryan | ...................... G06Q 20/20 |

\* cited by examiner

MULTI-DIMENSIONAL MODELING OF RESOURCE INTERACTION PROCESSORS

FIELD OF THE INVENTION

The present invention is generally related to providing resource interaction services to resource interaction processors and, more specifically, using multi-dimensional modeling of resource interaction processors for determining viability of deployment of resource interaction services.

BACKGROUND

Typically, an entity providing resource interaction services is restricted as to which resource interaction processors they can provide such services to. These restrictions may be both internal and external (e.g., government-imposed restrictions or the like). Such restrictions act as an impediment to new resource interaction processors and/or emerging types of resource interactions.

To compound the problem information and data associated with new resource interaction processors and/or emerging types of resource interactions may be scarce and/or difficult to obtain, especially in the instance in which the new resource interaction processor and/or type of resource interaction is one deemed to fall into a high-misappropriation category.

Therefore, a need exists to develop systems, methods, computer program products and the like which address the aforementioned problems.

BRIEF SUMMARY

The following presents a simplified summary of one or more embodiments of the invention in order to provide a basic understanding of such embodiments. This summary is not an extensive overview of all contemplated embodiments and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing for multi-dimensional modeling of resource interaction processors for determining viability of deployment of resource interaction services. The system leverages data captured from various sources along with internal and external rules and regulations applicable to resource interaction processors to provide a model for the resource interaction processor, i.e., determine whether the resource interaction processor meets requirements for resource interactions services. In the event that the resource interaction processor is determined to be viable, resource interactions services are deployed to the resource interaction processor.

A system for multi-dimensional modeling of resource interaction processors defines first embodiments of the invention. The system includes a resource interaction processor rules database that is stored in a first memory and configured to store a plurality of internal and external rules and regulations data associated with a plurality of types of resource interaction processors.

The system additionally includes a resource interaction processor/entity t analysis sub-system that includes a second memory, at least one first processor in communication with the second memory and first instructions that are stored in the second memory. The first instructions are executable by at least one first processor and configured to capture, from a plurality of data sources first data associated with a plurality of resource interaction processors associated with the entities in scope. The first instructions are further configured to aggregate and filter the captured first data. Filtering the data includes a value of first datum in comparison to trust levels associated with each of the data sources and removing at least a portion of the first data determined to have the value below a predetermined one of the trust levels.

The system additionally includes a model generating sub-system including a third memory, at least one second processor in communication with the third memory, and second instructions that are stored in the third memory. The second instructions are executable by the at least one second processor and configured to receive, from the resource interaction processor/entity analysis sub-system, aggregated and filtered first data associated with the one of the plurality of resource interaction processors. The second instructions are further configured to access the resource interaction processor database to retrieve internal and external rules and regulations data associated with one of the plurality of resource interaction processors. In addition, the second instructions are configured to implement a heuristics engine to determine, based at least on the retrieved internal and external rules and regulations data and the received aggregated and filtered first data, whether the one of the plurality of resource interaction processors is a viable candidate for deploying resource interaction processor services.

In specific embodiments the system further includes a services deployment sub-system including a fourth memory, at least one third processor in communication with the fourth memory, and third instructions that are stored in the fourth memory. The third instructions are executable by the at least one third processor and configured to, in response to determining that the one of the resource interaction processors is the viable candidate, deploy one or more resource interaction processor services to the one of the plurality of resource interaction processors. In specific embodiments of the system, the third instructions are configured to configure and issue resource interaction processing devices to the applicable resource interaction processor.

In further specific embodiments the system includes an data analysis sub-system including a fourth memory, at least one third processor in communication with the fourth memory and third instructions that are stored in the fourth memory. The third instructions are executable by the at least one third processor and configured to capture, from the plurality of data sources, second data associated with a plurality of existing or potential resource interaction merchants of the resource interaction processors. The third instructions are further configured to aggregate and filter the captured second data. Filtering the second data includes analyzing a value of second datum in comparison to trust levels associated with each of the data sources and removing at least a portion of the second data determined to have the value below a predetermined one of the trust levels. In such embodiments of the system, the second instructions of the model generating sub-system may be further configured to receive, from the data analysis sub-system, aggregated and filtered second data associated with at least one of the plurality of existing or potential resource interaction entities. The second instruction may be further configured to implement the heuristics engine to determine, based at least on (i) the retrieved external rules and regulations data, and (ii) the received aggregated and filtered first and second data, whether the one of the plurality of resource interaction processors is a viable candidate for deploying resource interaction processor services.

In still further embodiments of the system, the first instructions of the merchant analysis sub-system are further configured to determine, based on the aggregated and filtered first data, a location for each of the plurality of resource interaction processors. In such embodiments of the system, the second instructions of the model generating sub-system are further configured to receive, from the resource interaction processor data analysis sub-system, the location of the one of the plurality of resource interaction processors and access the resource interaction processor database to retrieve the external rules and regulations data associated with the location of the resource interaction processor.

Moreover, in additional specific embodiments the system includes a processor type data analysis sub-system including a fourth memory, at least one third processor in communication with the fourth memory and third instructions that are stored in the fourth memory. The third instructions are executable by the at least one third processor and configured to capture, from the plurality of data sources, second data associated with one of a plurality of resource interaction processor types. The third instructions are further configured to aggregate and filter the captured second data. Filtering the second data includes analyzing a value of each second datum in comparison to trust levels associated with each of the data sources and removing at least a portion of the second data determined to have the value below a predetermined one of the trust levels. In such embodiments of the system, the second instructions of the model generating sub-system are further configured to receive, from the processor type data analysis sub-system, aggregated and filtered second data associated with at least one of the plurality of resource interaction processor types. The second instructions are further configured to implement the heuristics engine to determine, based at least on (i) the retrieved external rules and regulations data, and (ii) the received aggregated and filtered first and second data, whether the one of the plurality of resource interaction processors is a viable candidate for deploying resource interaction processor services.

In still further specific embodiments, the system includes a distributed trust computing network comprising a plurality of decentralized nodes, each decentralized node having a fourth memory and at least one third processor in communication with the fourth memory, wherein the fourth memory of the decentralized nodes is configured to store at least one distributed ledger. The decentralized nodes are configured to act as source of truth in verifying an identity of each of the plurality of resource interaction processors.

A computer-implemented method for multi-dimensional modeling of resource interaction processors defines second embodiments of the invention. The method is executed by one or more computing processor devices. The method includes capturing, from a plurality of data sources, first data associated with a plurality of resource interaction processors. The method further included aggregating and filtering the captured first data. Filtering includes analyzing a value of first datum in comparison to trust levels associated with each of the data sources and removing at least a portion of the first data determined to have the value below a predetermined one of the trust levels. Additionally, the method includes accessing a resource interaction processor database to retrieve internal and external rules and regulations data associated with one of the plurality of resource interaction processors. Further, the method includes implementing a heuristics engine to determine, based at least on (i) the retrieved internal and external rules and regulations data and the (ii) aggregated and filtered first data, whether the one of the plurality of resource interaction processors is a viable candidate for deploying resource interaction processor services.

In specific embodiments the method further includes, in response to determining that the one of the plurality of resource interaction processors is the viable candidate, deploying one or more resource interaction processor services to the one of the plurality of resource interaction processors.

In other specific embodiments the method further includes capturing, from the plurality of data sources, second data associated with a plurality of existing or potential resource interaction entities configured to perform resource interactions at the resource interaction processors. In addition, the method includes aggregating and filtering the captured second data. Filtering includes analyzing a value of second datum in comparison to trust levels associated with each of the data sources and removing at least a portion of the second data determined to have the value below a predetermined one of the trust levels. In such embodiments of the method, implementing further includes implementing the heuristics engine to determine, based at least on the (i) retrieved external rules and regulations data, and (ii) the aggregated and filtered first data, and (iii) the aggregated and filtered second data, whether the one of the plurality of resource interaction processors is a viable candidate for deploying resource interaction processor services.

In still further specific embodiments the method includes determining, based on the aggregated and filtered first data, a location for each of the plurality of resource interaction processors. In such embodiments of the method, accessing further includes accessing the resource interaction processor database to retrieve the external rules and regulations data associated with the location of the resource interaction processor.

In additional specific embodiments the method includes capturing, from the plurality of data sources, second data associated with one of a plurality of resource interaction processor types and aggregating and filtering the captured second data. The filtering includes analyzing a value of each second datum in comparison to trust levels associated with each of the data sources and removing at least a portion of the second data determined to have the value below a predetermined one of the trust levels. In such embodiments of the method implementing further includes implementing the heuristics engine to determine, based at least on the (i) retrieved external rules and regulations data, (ii) the aggregated and filtered first data, and (iii) the aggregated and filtered second data, whether the one of the plurality of resource interaction processors is a viable candidate for deploying resource interaction processor services. Moreover, in additional embodiments the method further includes verifying, via convergence of a plurality of nodes within a distributed trust computing network, an identity of each of the plurality of resource interaction processors.

A computer program product including a non-transitory computer-readable medium defines third embodiments of the invention. The computer-readable medium includes a first set of codes for causing a computer to capture, from a plurality of data sources, first data associated with a plurality of resource interaction processors. Additionally, the computer-readable medium includes a second set of codes for causing a computer to aggregate and filter the captured first data. Filtering includes analyzing a value of first datum in comparison to trust levels associated with each of the data sources and removing at least a portion of the first data determined to have the value below a predetermined one of the trust levels. In addition, the computer-readable medium includes a third set of codes for causing a computer to access a resource interaction processor database to retrieve internal and external rules and regulations data associated with one of the plurality of resource interaction processors. Further, the computer-readable medium includes a fourth set of codes for causing a computer to implement a heuristics engine to determine, based at least on (i) the retrieved internal and external rules and regulations data and the (ii) aggregated and filtered first data, whether the one of the plurality of resource interaction processors is a viable candidate for deploying resource interaction processor services.

In specific embodiments of the computer program product, the computer-readable medium additionally includes a fifth set of codes for causing a computer to in response to determining that the one of the plurality of resource interaction processors is the viable candidate, deploying one or more resource interaction processor services to the one of the plurality of resource interaction processors.

In still further specific embodiments of the computer program product, the first set of codes is further configured to cause the computer to capture, from the plurality of data sources, second data associated with a plurality of existing or potential resource interaction entities configured to perform resource interactions at the resource interaction processors. In such embodiments of the computer program product, the second set of codes is further configured to cause the computer to aggregate and filter the captured second data, wherein filtering includes analyzing a value of second datum in comparison to trust levels associated with each of the data sources and removing at least a portion of the second data determined to have the value below a predetermined one of the trust levels. Moreover, in such embodiments of the computer program product the fourth set of codes is further configured to cause the computer to implement the heuristics engine to determine, based at least on the (i) retrieved external rules and regulations data, and (ii) the aggregated and filtered first data, and (iii) the aggregated and filtered second data, whether the one of the plurality of resource interaction processors is a viable candidate for deploying resource interaction processor services.

In additional specific embodiments the computer-readable medium of the computer program product includes a fifth set of codes for causing a computer to determine, based on the aggregated and filtered first data, a location for each of the plurality of resource interaction processors. In such embodiments of the computer program product, the third set of codes is further configured to cause the computer to access the resource interaction processor database to retrieve the external rules and regulations data associated with the location of the resource interaction processor.

Thus, according to embodiments of the invention, which will be discussed in greater detail below, the present invention provides for multi-dimensional modeling of resource interaction processors for determining viability of deployment of resource interaction services. The system leverages data captured from various sources along with internal and external rules and regulations applicable to a resource interaction processor to determine whether the resource interaction processor meets requirements for resource interactions services. In the event that the resource interaction processor is determined to be viable, resource interactions services are deployed to the resource interaction processor.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
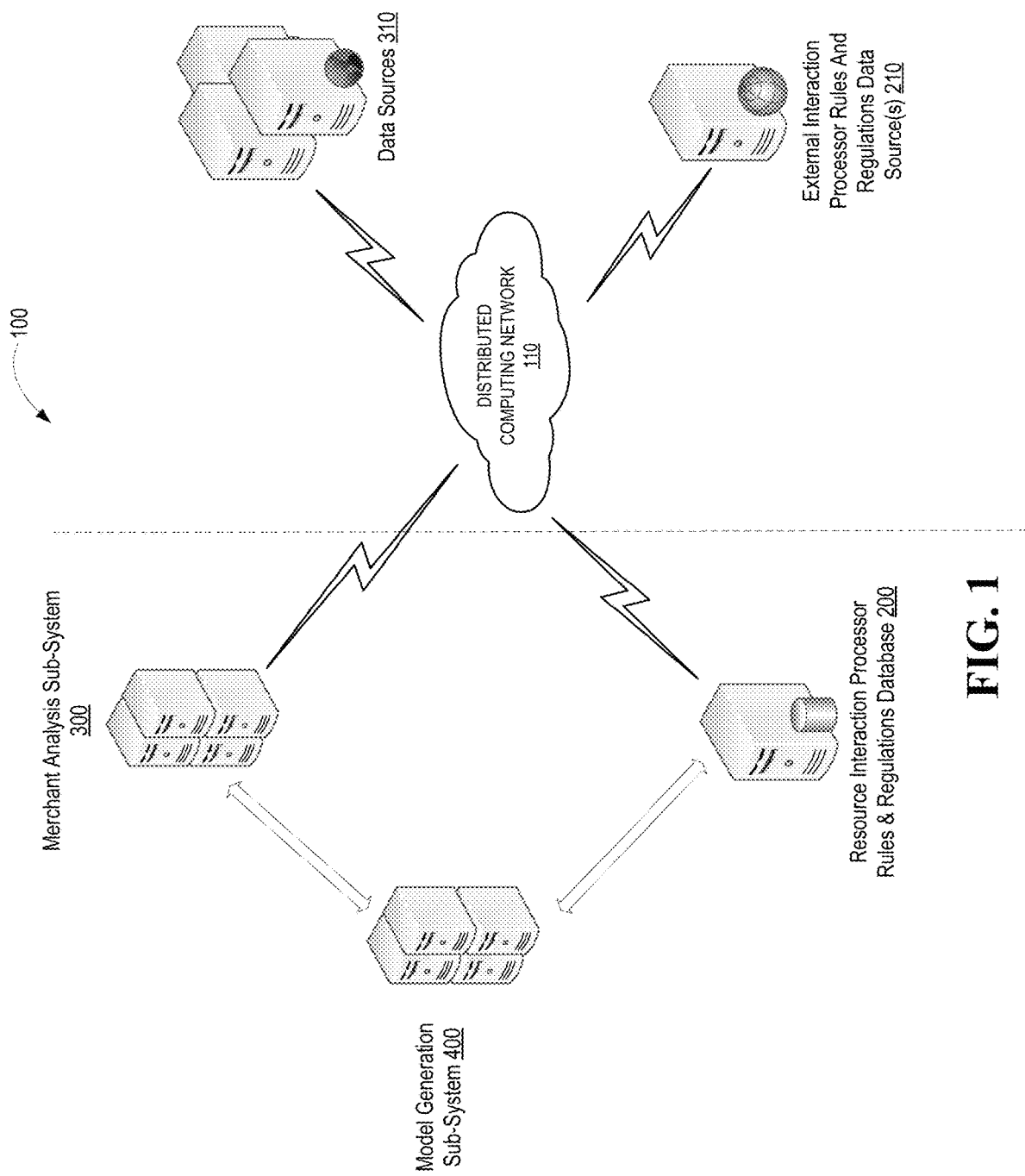
Figure 2:
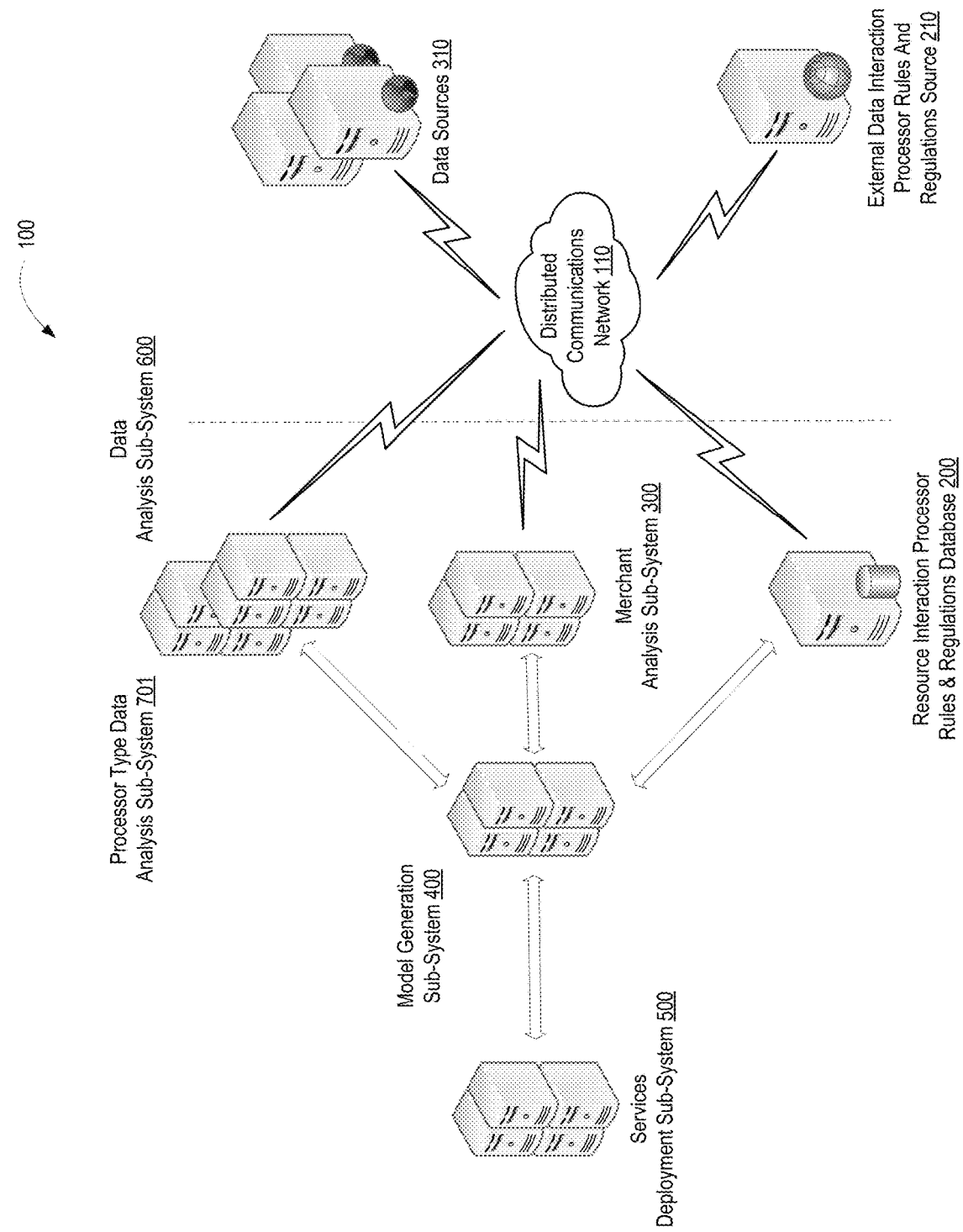
Figure 3:
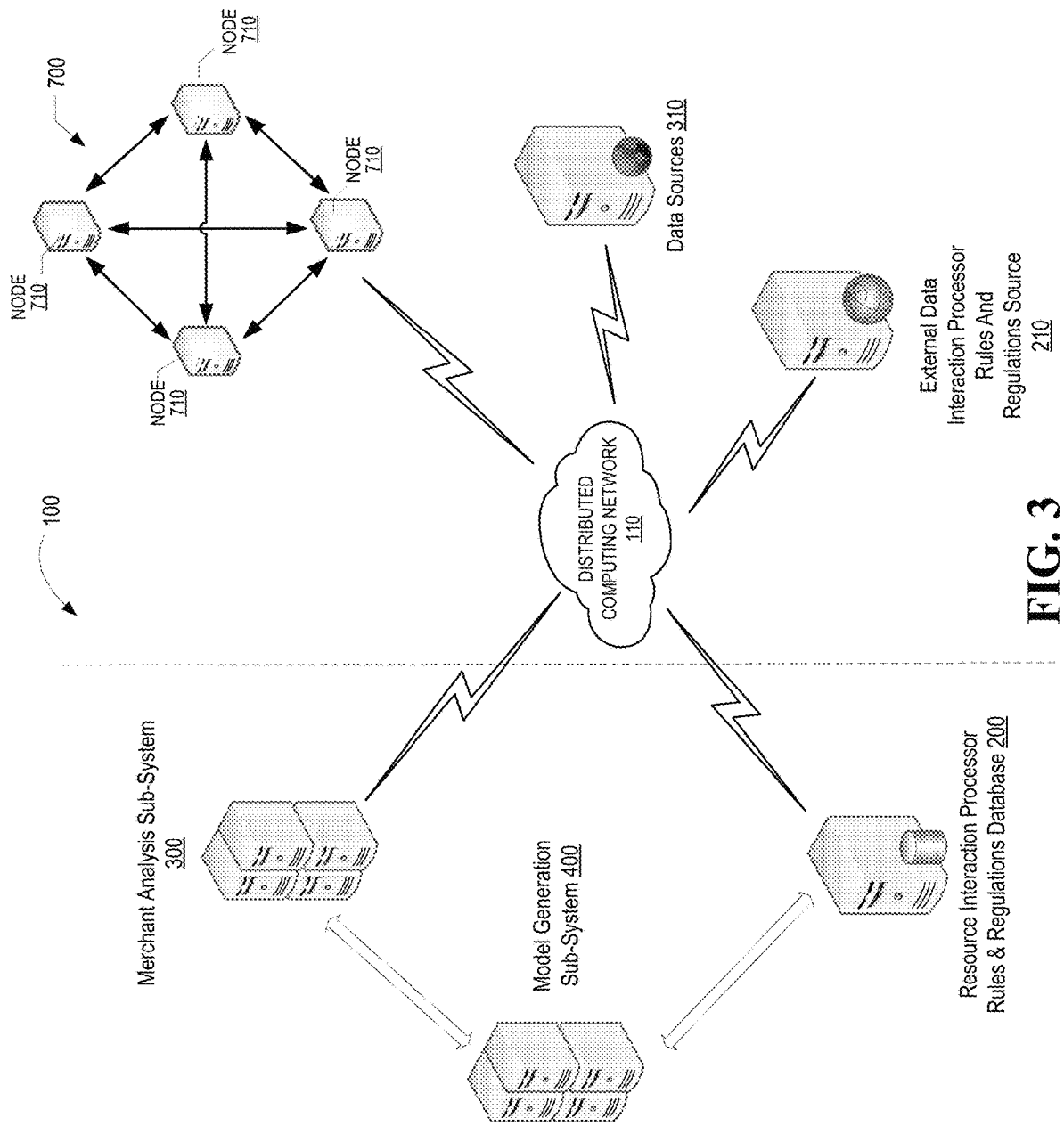
Figure 4:
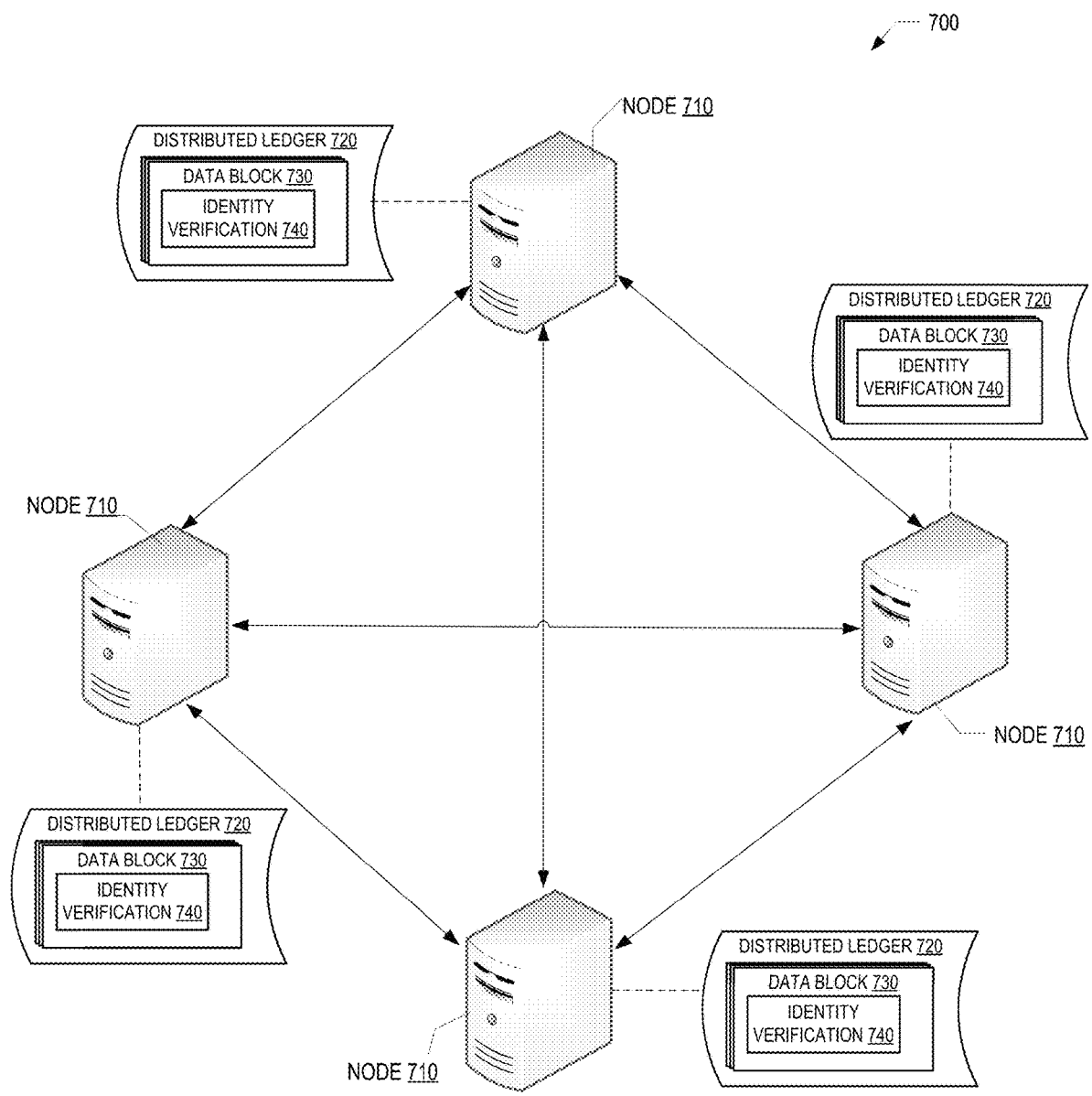
Figure 5:
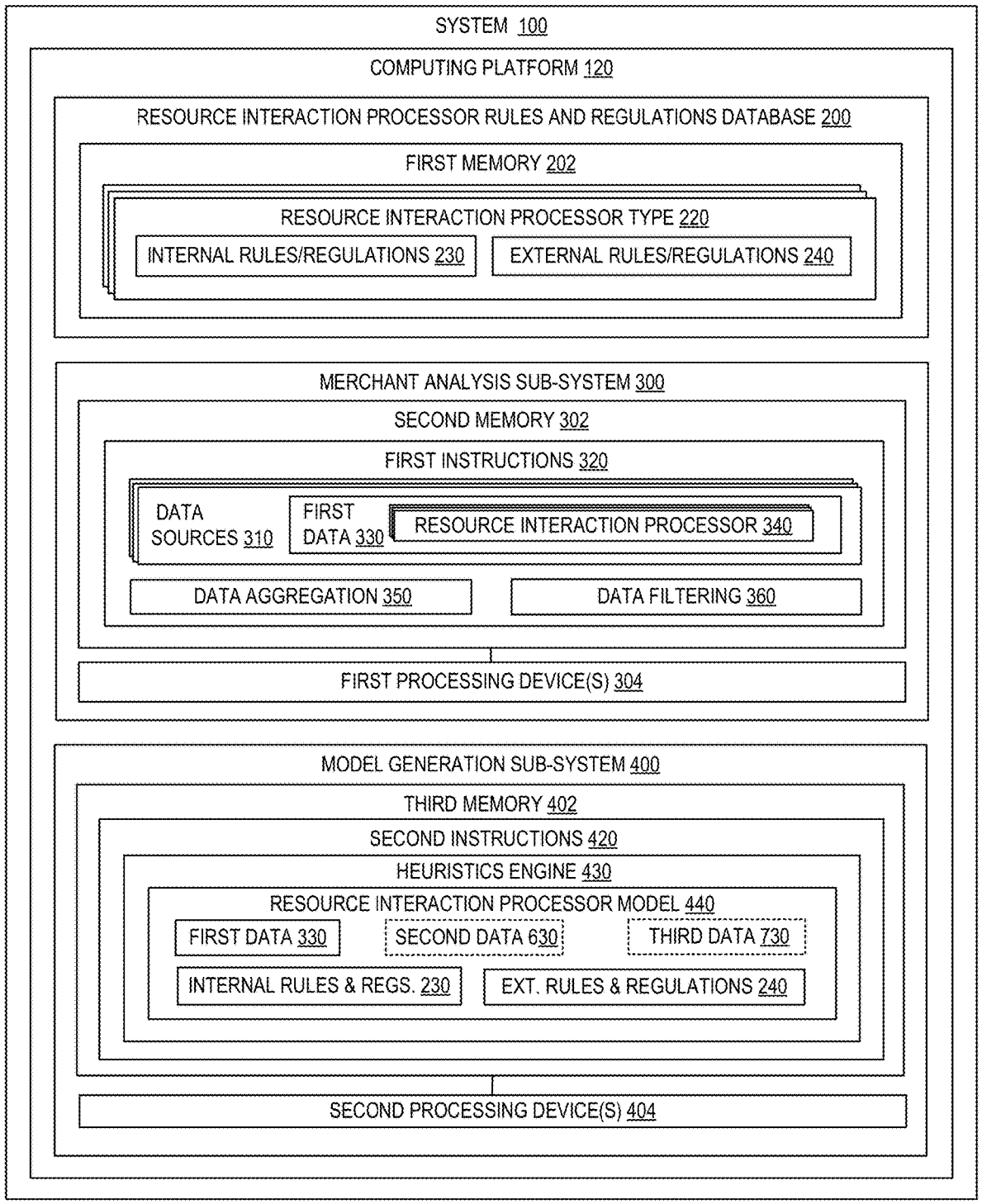
Figure 6:
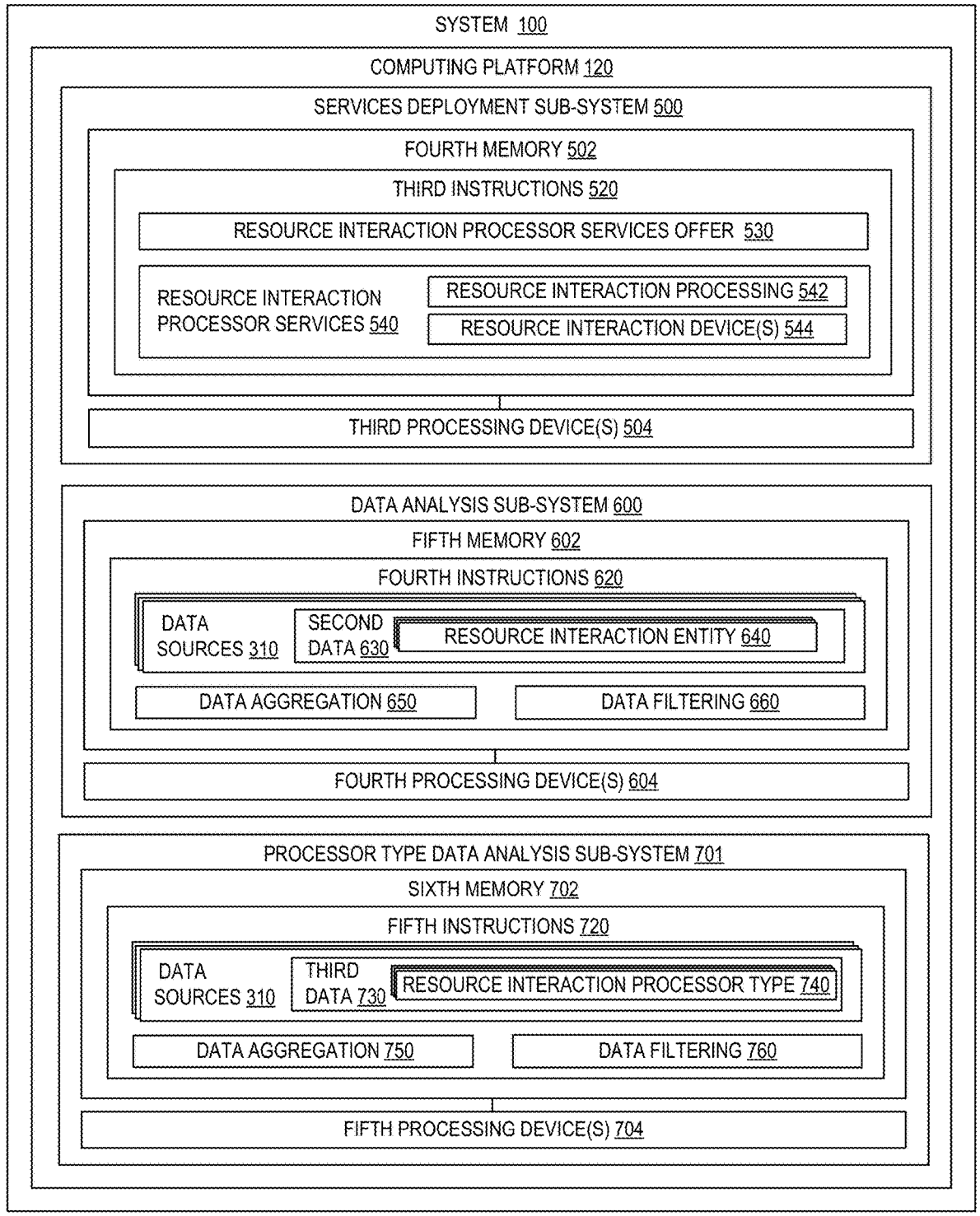
Figure 7:
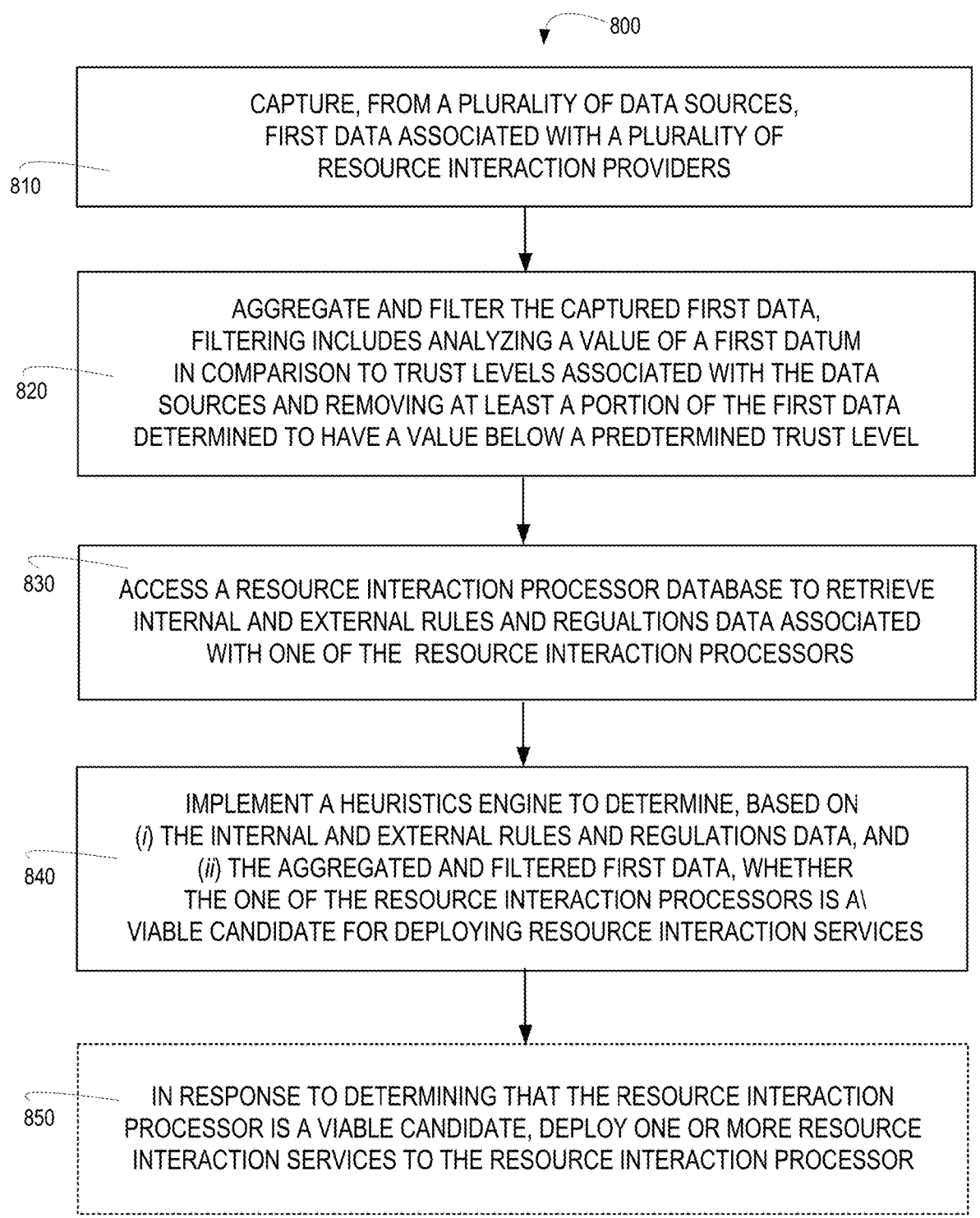

Having thus described embodiments of the disclosure in general terms, reference will now be made to the accompanying drawings, wherein:

FIG. 1 is a schematic diagram of a system for multi-dimensional modeling of resource interaction processors, in accordance with embodiments of the present invention;

FIG. 2 is a schematic diagram of an alternate system for multi-dimensional modeling of resource interaction processors, in accordance with some embodiments of the present disclosure;

FIG. 3 is a schematic diagram of an alternate system for multi-dimensional modeling of resource interaction processors, in accordance with some embodiments of the present disclosure;

FIG. 4 is a schematic diagram of a trusted distributed computing network, in accordance with embodiment of the present invention;

FIGS. 5 and 6 are a block diagram of a system for multi-dimensional modeling of resource interaction processors, in accordance with embodiments of the present invention; and FIG. 7 is flow diagram of a method for multi-dimensional modeling of resource interaction processors, in accordance with embodiments of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one of skill in the art in view of this disclosure, the present invention may be embodied as a system, a method, a computer program product or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer-readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a timedependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted or unscripted programming language such as JAVA, PERL, SMALLTALK, C++, PYTHON or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or systems. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute by the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus to cause a series of operational events to be performed on the computer or other programmable apparatus to produce a computer implemented process such that the instructions, which execute on the computer or other programmable apparatus, provide events for implementing the functions/acts specified in the flowchart and/or block diagram block or blocks. Alternatively, computer program implemented events or acts may be combined with operator or human implemented events or acts in order to carry out an embodiment of the invention.

As the phrase is used herein, a processor may be "configured to" perform or "configured for" performing a certain function in a variety of ways, including, for example, by having one or more general-purpose circuits perform the function by executing particular computer-executable program code embodied in computer-readable medium, and/or by having one or more application-specific circuits perform the function.

Thus, according to embodiments of the invention, which will be described in more detail below, systems, methods and computer program products are disclosed that provide for multi-dimensional modeling of resource interaction processors for determining the viability of deployment of resource interaction services. The system leverages data captured from various sources along with internal and external rules and regulations applicable to a resource interaction processor to provide a model for the resource interaction processor, i.e., determine whether the resource interaction processor meets requirements for resource interactions services. In the event that the resource interaction processor is determined to be viable, resource interactions services are deployed to the resource interaction processor.

In specific embodiments of the invention the resource interaction processor is a merchant or merchant system that conducts resource interactions. Resource interactions may include any financial transactions between a customer and the merchant or the merchant and vendors. More specifically, the merchant may be a new or emerging merchant, which may be participating in a new or emerging industry. The new and/or emerging merchant may desire resource interaction services, e.g., merchant services, to conduct their business. Resource interaction services, as used herein may refer to merchant services such as financial services that allow a business to accept credit/debit card transactions using order or Point-of-Sale (POS) systems/devices (i.e., payment processing or the like).

Many rules and regulations are in place, such as the U.S. Patriot Act and the like, which place stringent controls and restrictions on financial institutions ability to provide merchant services to certain types of merchants, such as merchants that conduct business in areas deemed to be high-misappropriation level (e.g., potential for misappropriation, or otherwise associated with illegal activity). In addition, these rules and regulations vary depending upon where the business is located or otherwise conducts business (e.g., which country and/or state/region the business is located in or conducts business in). Moreover, due to the nature of the threat posed by these high-misappropriation businesses, many of these rules and regulations are deemed to be fluid, in that, the rules and regulations may be dynamically revised and/or have yet to be developed and/or enacted.

Entities that desire to provide resource interaction services (e.g., merchant services), such as financial institutions or the like to such new and/or emerging resource interaction processors (e.g., merchants) may have little knowledge or background on such merchants. Such is especially the case, if the merchant does business in a known high-misappropriation industry.

As such, the present invention provides for an automated resource interaction processor (e.g., merchant) modeling system that allows an entity providing resource interaction services (e.g., merchant services) to determine whether the merchant is a viable candidate for providing resource interaction services (e.g., merchant services). The system takes a multi-dimensional approach in modeling the resource interaction processors. This multi-dimensional approach serves to learn as much as possible about the resource interaction processor through capturing information related to the resource interaction processor from both conventional and non-conventional/alternative data sources. Once the data has been captured and properly filtered to eliminate data of low value from untrusted sources, the data, along with currently applicable internal and external rules and regulations, is used to generate a model for the resource interaction processor. The model provides an indication as to whether the resource interaction processor/merchant is a viable, or otherwise acceptable, candidate for providing merchant services to (e.g., the merchant is conducting a legitimate/legal business that adheres to current rules and regulations or the like).

Referring to FIG. 1, a schematic diagram is depicted of a system 100 for multi-dimensional modeling of resource interaction processors, in accordance with embodiments of the present invention. The system is implemented in a distributed computing network 110, which may include the Internet and one or more intranets or the like. The system 100 includes a resource interaction processor rules and regulations database 200 that is configured to store a plurality of a plurality of both internal and external rules and regulations data associated with a plurality of types of resource interaction processors. Internal rules and regulations are those that are internal to the entity performing the modeling, while external rules and regulations are those mandated by external entities, such as a federal, state or local government or the like. Types of resource interaction processors may indicate the area/space in which the resource interaction processor conducts resource interactions. In specific embodiments in which the resource interaction processor is a merchant, the "type" of merchant may define the industry or the like that the merchant does business in.

In specific embodiments of the invention, the resource interaction processor rules and regulations database 200 is in communication, via distributed communication network 110, with one or more external resource interaction processor rules and regulations data sources 210. In those embodiments of the invention in which the resource interaction processor is a merchant, the external rules and regulations data sources 210 may be government agencies or the like which issue rules and regulations which directly or indirectly pertain to which merchants meet requirements for authorizing the use of merchant services. The rules and regulations database 200 is configured to ensure that the internal and external rules and regulations are up-to-date (i.e., reflect the rules and regulations currently enacted or otherwise in force. As such, the rules and regulations database 200 may be configured to periodically poll the external rules and regulations data sources 210 for any new rules or regulations and/or updates/revisions to existing rules and regulations. In other embodiments of the invention, the external rules and regulations data sources 210 are configured to automatically communicate any new rules and regulations and/or updates/revisions to existing rules and/or regulations upon enactment of such new/revised rules and regulations.

The system 100 additionally includes a merchant analysis sub-system 300 that is configured to capture data associated with the resource interaction processors, aggregate the data and filter the data (i.e., determine which data is acceptable for modeling the resource interaction processor by comparing the value of the data to the misappropriation level associated with the data source). The data is captured or otherwise received from a plurality of external data sources 310. The external data sources 310 may include conventional data sources, such as government agencies, business rating entities or the like and non-conventional data sources, such as social media websites, or other websites that provide advertisements associated with a resource interaction processor, such as, in specific embodiments of the invention, a merchant. Moreover, the non-conventional or alternative data sources may include data source that are only accessible by means of specialized software, such as the "dark web" or the like. In specific embodiments of the invention, the identity of the resource interaction processor is known to the entity performing the modeling and, as such, the capturing of data from the data sources 310 may provide for targeted searches at the data sources 310 and/or scraping of data off of the websites, such as social media sites or web sites that display advertisements for the merchant or the like. In other instances, the entity performing the modeling may be unaware of the identity of the new and or emerging resource interaction processors/merchants. In such embodiments of the invention, the merchant analysis sub-system 300 implements artificial intelligence including, in some instances, machine-learning techniques to identify new/emerging resource interaction processors, e.g., merchants or the like from the data captured from the plurality of data sources 310. Once a new/emerging resource interaction processor/merchant has been identified, sub-system 300 may be configured to monitor the various data sources, such as social media sites and the like, for data associated with the new-emerging resource interaction processor/merchant. Monitoring may include continuously applying keyword searches at the data sources 310 to determine when new data associated with the resource interaction processor is posted on the site or otherwise made available.

Once the data has been captured, the merchant analysis sub-system 300 is configured to aggregate and filter the data as a means of determining which data should be used in the subsequent modeling process. Filtering of the data provides for assessing the value of a datum (i.e., data item) in comparison to the misappropriation level associated with the data source. The misappropriation level associated with the data source indicates the trust associated with the data source (e.g., is the data valid or was the data manipulated to benefit the resource interaction processor, so-called "padded data"). In the event that the data item provides minimal value and/or the misappropriation level associated with the data source exceeds an acceptable level, the datum may be removed from the data set that is subsequently used to perform the resource interaction processor/merchant modeling.

The system additionally includes a model generating sub-system 400 that is configured to (i) receive, from the merchant analysis sub-system 300, aggregated and filtered data associated with a resource interaction processor/merchant and (ii) access the rules and regulation database to retrieve the internal and/or external rules and regulations applicable to the resource interaction processor/merchant, and (iii) implement a data heuristics engine or the like to generate, based at least on the received data and retrieved rules and regulations, a resource interaction processor/merchant model. The model indicates whether the resource interaction processor/merchant is a viable candidate (e.g., meets rules and regulations and other criteria) for receiving resource interaction/merchant services. In specific embodiments of the invention, the resource interaction processor/merchant model may include a score, which must meet or exceed a threshold score for the resource interaction processor/merchant to be deemed viable or otherwise acceptable for receiving resource interaction processor/merchant services. In this regard, the decisioning process as to whether a resource interaction processor can be offered or otherwise provided resource interaction/merchant services may be a fully automated process or, in other instances, a user may review and approve/disapprove the decision resulting from the modeling process.

Referring to FIG. 2 a schematic diagram is depicted of a system 100 for multi-dimensional modeling of resource interaction processors, in accordance with alternate embodiments of the present invention. The system 100 of FIG. 2 provides for additional optional features and/or facets in addition to the features described in relation to FIG. 1. Specifically, FIG. 2 illustrates additional information/data that may be used in the resource interaction processor/merchant modeling procedure, as well as, illustrating how the model and/or the determination that a resource interaction processor/merchant is a viable candidate for resource interaction/merchant services is subsequently used for deployment of the services.

In specific embodiments of the invention, system 100 includes data analysis sub-system 600 that is configured to capture, aggregate and filter data associated with entities that conduct or may conduct resource interactions with the resource interaction processor. For example, in specific embodiments of the invention, in which the resource interaction processor is a merchant, the entities are customers or potential customers of the merchant. Entity data analysis sub-system 600 is configured to capture data associated with the resource interaction entities, aggregate the data and filter the data (i.e., determine which data is acceptable for modeling the resource interaction processor by comparing the value of the data to the misappropriation level associated with the data source). The data is captured or otherwise received from a plurality of external data sources 310 and, in some instances, internal data sources (not shown in FIG. 2). The external data sources 310 may include any publicly accessible data source, such as social media websites or the like that may indicate that the entity is conducts resource interactions with the resource interaction processor/merchant or is contemplating or otherwise desires to conduct a resource interaction with the resource interaction processor/merchant (i.e., is a potential resource interaction entity). In specific embodiments of the invention, the data itself may identify the entity, while in other instances of the invention the identity may be unknown or needs to be confirmed. In such embodiments of the invention, the data analysis sub-system 600 implements artificial intelligence including, in some instances, machine-learning techniques to identify the entities, e.g., customers or the like from the data captured from the plurality of data sources 310. In specific embodiments of the invention, in which the identity of the resource interaction entity has been determined or is otherwise known, the capturing of data from the data sources 310 may provide for targeted searches at the data sources 310 and/or scraping of data off of the websites, such as social media sites or sites that display information associated with the entity (e.g., posts made by the entity on the social media sites or the like). Further, once an entity has been identified, sub-system 600 may be configured to monitor the various data sources, such as social media sites and the like, for data associated with the entity. Monitoring may include continuously applying keyword searches at the data sources 310 to determine when new data associated with the resource interaction entity is posted on the site or otherwise made available.

Once the data has been captured, the data analysis sub-system 600 is configured to aggregate and filter the data as a means of determining which data should be used in the subsequent modeling process. Filtering of the data provides for assessing the value of a datum (i.e., data item) and/or entity in comparison to the misappropriation level associated with the data source. In the event that the data item or entity provides minimal value and/or the misappropriation level associated with the data source exceeds an acceptable level, the datum may be removed from the data set that is subsequently used to perform the resource interaction processor/merchant modeling. The value of an entity may be assessed by learning more about the entity. For example, once the identity of the entity is known and/or confirmed, entity data analysis sub-system 600 may determine if the entity/customer is associated with the entity/financial institution performing the resource interaction processor/merchant modeling. For example, determining if the entity/customer is a user/account holder or the like at the financial institution conducting the modeling. If the entity is a user of the entity conducting the resource interaction processor/merchant modeling, the value of the entity may be determined, by accessing internal data sources to determine the volume or fluidity of resources in the entity's accounts and/or the types of transactions that the entity conducts (i.e., transactions similar to transactions conducted by the resource interaction processor/merchant). Once the entity data has been captured, aggregated and filtered, the entity data is received by model generating sub-system 400 and used as a determinative factor in rendering the resource interaction processor/merchant model.

In other specific embodiments of the invention, system 100 includes resource interaction entity processor type analysis sub-system 700 that is configured to capture, aggregate and filter data associated with types of resource interaction processors. In those embodiments of the invention in which the resource interaction processor is a merchant, the types may include industries, sectors or the like to which a specific merchant undergoing modeling is associated with (e.g., the industry in which the merchant conducts transactions or the like). Processor type data analysis sub-system 701 is configured to capture data associated with the type/industry of the resource interaction processor/merchant, aggregate the data and filter the data (i.e., determine which data is acceptable for modeling the resource interaction processor by comparing the value of the data to the misappropriation level associated with the data source). The data is captured or otherwise received from a plurality of external data sources 310. It should be noted that the data sources 310 may be the same data sources used to capture data associated with the resource interaction processor and/or entities or the data sources 310 may be different data sources. The data sources 310 may include any publicly accessible data sources, such as business-related websites or the like. Capturing of data from the data sources 310 may provide for targeted searches at the data sources 310 and/or scraping of data off of the websites that display relevant information associated with the type of the resource interaction processor. Further, sub-system 700 may be configured to monitor the various data sources for data associated with the type of resource interaction processors. Monitoring may include continuously applying keyword searches at the data sources 310 to determine when new data associated with the type of resource interaction processor is posted on the site, stored in a database or otherwise made available.

Once the data has been captured, the data analysis sub-system 700 is configured to aggregate and filter the data as a means of determining which data should be used in the subsequent modeling process. Filtering of the data provides for assessing the value of a datum (i.e., data item) in comparison to the misappropriation level associated with the data source. In the event that the data item or entity provides minimal value and/or the misappropriation level associated with the data source exceeds an acceptable level, the datum may be removed from the data set that is subsequently used to perform the resource interaction processor/merchant modeling. Once the resource interaction processor/merchant type/industry data has been captured, aggregated and filtered, the data is received by model generating sub-system 400 and used as a determinative factor in rendering the resource interaction processor/merchant model.

It should be note that while data analysis sub-system 600 and processor type data analysis sub-system 701 are shown and described as individual sub-systems, the functionality of these sub-systems may be included in the merchant analysis sub-system 300 or any other comprehensive sub-system.

The system 100 additionally includes resource interaction processor services deployment sub-system 500 that is configured to perform actions in response to a resource interaction processor model indicating that the resource interaction processor is a viable candidate or otherwise deemed acceptable for rendering resource interaction processor/merchant services. In specific embodiments of the invention, services deployment sub-system 500 may be configured to automatically deploy services to the resource interaction processor, in response to determining that the resource interaction processor's model indicates that they are a viable candidate. Such deployment of services may include configuring resource interaction processor-specific devices, such as POS device or the like, and providing such devices to the resource interaction processor/merchant. In other embodiments of the invention, a resource interaction processor model indicating that the resource interaction processor is a viable candidate, may trigger the services deployment sub-system to generate and communicate offers to the resource interaction processors/merchant for resource interaction services, such as payment processing services or the like.

Referring to FIG. 3 a schematic diagram is depicted of a system 100 for multi-dimensional modeling of resource interaction processors, in accordance with alternate embodiments of the invention. The system 100 of FIG. 3 provides for additional optional features and/or facets in addition to the features described in relation to FIG. 1. Specifically, FIG. 3 illustrates the implementation of a distributed trust computing network 700, such as a blockchain network as a source of truth for verifying the identity of a resource interaction processor, such as a merchant, and/or resource interaction entities, such as existing or potential customers of the merchant.

The distributed trust computing network 700 includes a plurality of decentralized nodes 710. Each decentralized node 710 has a memory (not shown in FIG. 3) and one or more processing devices (not shown in FIG. 3) in communication with the memory. The memory stores at least one distributed ledger 720 (shown in FIG. 6) comprising a plurality of "chained" data blocks 730 (shown in FIG. 6). Each data block 730 stores identity verification data 740 (shown in FIG. 6), related to a resource interaction processor, such as a merchant or a resource interaction entity, such as an existing or potential customer of the merchant.

In a distributed trust computing network, the security of the data maintained within the trust network is enhanced by the distributed nature of the network/block chain. The distributed trust computing network 700 typically includes several decentralized nodes 710, which may be one or more systems, machines, computers, databases, data stores or the like operably connected with one another. In some instances, each of the decentralized nodes 710 or multiple nodes 710 are maintained by different entities. A distributed trust computing network 700 typically works without a central repository or single administrator. One well-known application of a distributed trust computing network/block chain is the public ledger of transactions for cryptocurrencies such as used in bitcoin. The data records recorded in the distributed trust computing network/block chain are enforced cryptographically and stored on the nodes of the block chain.

A distributed trust computing network 700 provides numerous advantages over traditional storage networks/databases. A large number of nodes 710 of a trust network may reach a consensus, otherwise referred to as converging, regarding the validity of resources maintained with a block of the blockchain. In the present invention, the nodes 710 may converge of the identity of a resource interaction processor or entity as a means of verifying the identity of the processor or entity.

Additionally, when multiple versions of a record exist on the ledger 720 (e.g., multiple data blocks 730 including the identity verification data 740 associated with the processor or entity), multiple nodes 710 can converge on the most up-to-date version of the record, such that the most-up-to-date version of the record is the only one of the versions that is validated. For example, any node 710 within the distributed trust computing network 700 that stores a record can determine within a level of certainty whether the record can be authenticated/authorized to take place and become final by confirming that no conflicting records are confirmed by the distributed trust computing network/block chain elsewhere.

The distributed trust computing network 700 typically has two primary types of records. The first type is the record type, which consists of the actual data stored in a block 730 within a distributed ledger 720. The second type is the block type, which are records that confirm when and in what sequence certain events became recorded as part of the blockchain. Records and the events associated therewith are created by participants using the blockchain in its normal course of business, for example, when record is received, a block(s) 730 is created by users known as "miners" who use specialized software/equipment to create blocks 730. Holders (also, referred to as users) of a block 730 of the blockchain agree to store a record within the distributed trust computing network 700 and the related records are passed around to various nodes 710 of the distributed trust computing network 700. A "valid" record or related event is one that can be validated based on a set of rules that are defined by the particular system implementing the distributed trust computing network/block chain.

In accordance with embodiments of the present invention, in response to the distributed trust computing network 700 validating the identity of a resource interaction processor/merchant, further data analysis is performed on the resource interaction processor/merchant including capturing of data associated with the resource interaction processor/merchant and, subsequently, generating the model for the resource interaction processor/merchant. In other embodiments of the present invention, in response to the distributed trust computing network 700 validating the identity of a resource interaction entity/customer, further data analysis is performed on the resource interaction entity/customer including capturing of data associated with the resource interaction entity/customer and, subsequently, using the resource interaction entity/customer data in the generating of the model for the resource interaction processor/merchant.

A distributed trust computing network/block chain 700 is typically decentralized—meaning that a distributed ledger 720 (i.e., a decentralized ledger) is maintained on multiple nodes 710 of the trust network/block chain 700. One node 710 in the distributed trust computing network 700/blockchain may have a complete or partial copy of the entire distributed ledger 720 or set of records and/or data blocks 730 on the distributed trust computing network 700/block chain. Events (e.g., addition of a new data block) are initiated at a node 710 of a distributed trust computing network 700/block chain and communicated to the various nodes 710 of the distributed trust computing network 700/blockchain. Any of the nodes 710 can validate a record or an associated event, add the record or the details of the storage event to its copy of the distributed ledger 720, and/or broadcast the record or details of the storage event, its associated validation (in the form of a block 730) and/or other data to other nodes 710. The distributed trust computing network 700 shown in FIGS. 3 and 4 is configured to perform one or more of the steps or functions performed by the system shown in FIGS. 1 and 2.

FIGS. 5 and 6 depict a block diagram of a system for multi-dimensional modeling of resource interaction processors, in accordance with various embodiments of the present invention. The includes a computing platform 120, which may comprise one or typically more computing devices (e.g., servers, computing devices, or the like) and is configured to execute instructions, such as algorithms, modules, routines, applications and the like. Computing platform 120 includes memory 202, 302, 402, 502, 602, 702 and the like which may comprise volatile and non-volatile memory, such as read-only and/or random-access memory (RAM and ROM), EPROM, EEPROM, flash cards, or any memory common to computing platforms). Moreover, memory 202, 302, 402, 502, 602, 702 and the like may comprise cloud storage, such as provided by a cloud storage service and/or a cloud connection service.

Further, computing platform 120 also includes at least one processing device 304, 404, 504, 604, 704 or the like which may be an application-specific integrated circuit ("ASIC"), or other chipset, logic circuit, or other data processing device. Processing devices 304, 404, 504, 604, 704 or the like may execute one or more application programming interface (APIs) (not shown in FIG. 5 or 6) that interface with any resident programs, such as instructions 320, 420, 520, 620, 720 or the like stored in the memory 302, 402, 502, 602, 702 of the computing platform 120 and any external programs. Processing devices 304, 404, 504, 604, 704 may include various processing subsystems (not shown in FIG. 5 or 6) embodied in hardware, firmware, software, and combinations thereof, that enable the functionality of the computing platform 120 and the operability of the computing platform 120 on the distributed computing network 110 (shown in FIG. 1). For example, processing subsystems allow for initiating and maintaining communications and exchanging data with other networked devices, such as data sources 310 and external rules and regulations data source 210 (shown in FIG. 1). For the disclosed aspects, processing subsystems of system 100 may include any processing subsystem used in conjunction with the database 200 and various sub-systems 300, 400, 500, 600, 700 of the system 100 and related tools, routines, sub-routines, algorithms, sub-algorithms, sub-modules thereof.

It should be noted that while system 100 is depicted and described as having various sub-systems each having separate instructions, memory and processors, in other embodiments of the invention two or more of the sub-systems and/or the functions within a sub-system may be combined. In this regard, the system 100 may, according to specific embodiments of the invention, include one or more memory, one or more instructions and one or more processing devices.

Computing platform 120 may additionally include a communications module (not shown in FIG. 5 or 6) embodied in hardware, firmware, software, and combinations thereof, that enables electronic communications between the computing platform 120 and other network devices, such as data sources 310 and/or external rules and regulations data source 210 (shown in FIG. 1). Thus, a communications module may include the requisite hardware, firmware, software and/or combinations thereof for establishing and maintaining a network communication connection with one or more network devices.

Computing platform 120 includes resource interaction processing rules and regulations database 200, which stores, in first memory 202, internal rules and regulations 230 and external rules and regulations 240 associated with specific resource interaction processor types 220. In those embodiments of the invention, in which the resource interaction processor 340 is a merchant, the internal and external rules and regulations 230 and 240 are associated with specific merchant types (e.g., specific industries or the like). As previously noted, the internal rules and regulations 230 are associated with the entity conducting the resource interaction processor modeling process, while external rules and regulations are associated with government agencies (e.g., federal, state, local or the like) or the like. Since, new or revised internal and external rules and regulations 230, 240 may be constantly generated, the 200 is configured to in network communication with both internal rules and regulation sources and external rules and regulations sources (210 of FIGS. 1-3) as a means of insuring that the rules and regulations in database 200 reflect the currently enforce rules and regulations.

Computing platform 120 additionally includes 300, which stores, in second memory 302, first instructions 320 that are executable by first processing device(s) 304. The first instructions 320 are configured to capture first data 330 from a plurality of data sources 310. The first data 330 is data associated with or otherwise pertaining to resource interaction processors. The data sources 310 may be any publicly accessible network site, such as social media sites, sites that provide advertisements or the like and/or privately accessible network sites, such as the "dark web" or the like. In those instances in which the identity of a resource interaction processor is known, first instructions 320 may be configured to continuously monitor, or poll on a predetermined interval, the data sources 310 for the appearance of keywords related to a specific resource interaction processor and, in response to the appearance of one of the keywords at the data source 310, the instructions 320 may provide for capturing the data item that includes the keyword. In other instances in which the identity of the resource interaction processor is not known, first instructions 320 may be configured to continuously monitor, or poll on a predetermined interval, the data sources 310 for the appearance of generic keywords that indicate a resource interaction processor and, in response to the appearance of one of the keywords at the data source 310, the instructions 320 may provide for capturing the data item that includes the keyword.

In response to capturing the first data 330, the first data 330 is aggregated and filtered. Data aggregation 350 provides for grouping data according to a specific resource interaction processor. In those embodiments of the invention in which the identity of the resource interaction processor is unknown, a distributed trust computing network (700 of FIGS. 3 and 4) may be implemented as a source of truth for verifying/confirming the identity and/or location of a resource interaction processor. The identity verification/confirmation process may occur prior to data aggregation 350 and/or data filtering 360.

Data filtering 360 ensures that only data of value from trustworthy data sources is incorporated into the subsequent modeling process. In this regard, data filtering 360 includes analyzing a value of first datum in comparison to trust levels associated with each of the data sources and removing at least a portion of the first data determined to have the value below a predetermined one of the trust levels. Moreover, data filtering is implemented to remove data items that are redundant and/or data items that are viewed as manipulative (e.g., data items that have been strategically placed at a data source 310 for the purpose of increasing user favorability of the resource interaction processor or the like).

Computing platform 120 additionally includes model generating sub-system 400, which stores, in third memory 402, second instructions 420 that are executable by second processing device(s) 404. The second instructions 420 are configured to execute a modeling process for individual ones of the resource interaction processors. In this regard, second instructions 420 are configured to receive the aggregated and filtered first data 330 from the merchant analysis sub-system 300 and access the database 200 to retrieve internal rules and regulations 230 and external rules and regulations 240 applicable to the resource interaction processor (i.e., applicable to the type of resource interaction processor that the specific resource interaction processor is associated with).

In response, the second instructions 420 are configured to implement a heuristics engine to 430 generate a resource interaction processor model 440 for the resource interaction processor based at least on the first data 330 and the internal and external rules and regulations 230 and 240. The resource interaction processor model defines whether the resource interaction processors is a viable candidate for deploying resource interaction processor services. In specific embodiments of the invention the model includes a score indicative of the viability of the resource interaction processor as a candidate for resource interaction services. In such embodiments the score may be compared to a threshold score to determine if the resource interaction processor meets the criteria for being offered or otherwise deploying resource interaction processor services.

Referring to FIG. 6, alternate/optional sub-systems 500, 600 and 700 of system 100 are depicted and herein described, in accordance with optional embodiments of the invention. Computing platform 120 optionally includes resource interaction processor services deployment sub-system 500, which stores, in second memory 502, third instructions 520 that are executable by third processing device(s) 504. The third instructions 520 are configured to, in response to determining that the one of the plurality of resource interaction processors is the viable candidate, perform a resource service deployment action. The resource service deployment action may include generating and initiating communication of resource interaction processor service offers to the resource interaction processor. In those embodiments of the invention in which the resource interaction processor is a merchant, the sub-system 500 generates and initiates communication of merchant services offers to the merchant. In other embodiments of the invention, the resource service deployment action may include automatically deploying resource interaction processor services 540 to the resource interaction processor 340. Such services 540 may include, but are not limited to, resource interaction processing 542 (e.g., payment processing services) and/or resource interaction devices 544, which may be specific to the resource interaction processor (e.g., Point-Of-Sale (POS) devices or the like, which may be customized based on the needs of the merchant).

Computing platform 120 additionally includes data analysis sub-system 600, which stores, in fifth memory 602, fourth instructions 620 that are executable by fourth processing device(s) 604. The fourth instructions 620 are configured to capture second data 630 from a plurality of data sources 310. The data sources 310 may be the same data sources used to capture first data 330 or different data sources. The second data 630 is data associated with or otherwise pertaining to resource interaction entities 640, which in those embodiments of the invention in which the resource interaction processor is a merchant, the entities include existing or potential customers of the merchant. The data sources 310 may be any publicly accessible network site, such as social media sites or the like. Additionally, the data sources 310 may be internal to the entity providing the modeling, such as financial transaction/account databases that show that the customer has conducted transactions with a merchant.

In response to capturing the second data 630, the second data 630 is aggregated and filtered. Data aggregation 650 provides for grouping data according to a specific resource interaction entity 640 and the resource interaction processor 340 associated with the entity 640. Data filtering 660 ensures that only data of value from trustworthy data sources is incorporated into the subsequent modeling process. In this regard, data filtering 360 includes analyzing a value of second datum in comparison to trust levels associated with each of the data sources and removing at least a portion of the second data 630 determined to have a value below a predetermined one of the trust levels. Moreover, data filtering is implemented to remove data items that are redundant and/or data items that are viewed as manipulative (e.g., data items that have been strategically placed at a data source 310 for the purpose of increasing user favorability of the resource interaction processor 340 or the like). Subsequently, the aggregated and filtered second data 630 may, in specific embodiments of the invention, be used by the heuristics engine 430 of the model generating sub-system 400 to generate the resource interaction processor model 440.

Computing platform 120 additionally includes processor type data analysis sub-system 701, which stores, in sixth memory 702, fifth instructions 720 that are executable by fifth processing device(s) 704. The fifth instructions 720 are configured to capture third data 730 from a plurality of data sources 310. The data sources 310 may be the same data sources used to capture first data 330 or different data sources. The third data 730 is data associated with or otherwise pertaining to resource interaction processor types 740, which in those embodiments of the invention in which the resource interaction processor is a merchant, the entities include industries or other grouping/sectors of merchants. The data sources 310 may be any publicly accessible network site.

In response to capturing the third data 730, the third data 730 is aggregated and filtered. Data aggregation 750 provides for grouping data according to a specific resource interaction processor 340 undergoing modeling. Data filtering 760 ensures that only data of value from trustworthy data sources is incorporated into the subsequent modeling process. In this regard, data filtering 360 includes analyzing a value of third datum in comparison to trust levels associated with each of the data sources and removing at least a portion of the second data 630 determined to have a value below a predetermined one of the trust levels. Moreover, data filtering is implemented to remove data items that are redundant. Subsequently, the aggregated and filtered third data 730 may, in specific embodiments of the invention, be used by the heuristics engine 430 of the model generating sub-system 400 to generate the resource interaction processor model 440.

Referring to FIG. 7, a flow diagram is presented of a method 800 for multi-dimensional modeling of resource interaction processors, in accordance with embodiments of the present invention. At Event 810, first data associated with resource interaction processors is captured from a plurality of data sources. In specific embodiments of the invention, the resource interaction processors are merchants and, specifically prospective merchants that may desire merchant services. The data sources may be external data sources, accessible via the Internet or the like and may include conventional and non-conventional data sources including publicly accessible and privately accessible data sources. Additionally, the data sources may be internal data sources, accessible via an intranet or the like. The data may be captured by continuously monitoring, or polling on a regularly prescribed interval, the data sources for first data associated with resource interaction processors.

At Event 820, the captured first data is aggregated and filtered. Data aggregation provides for the first data to grouped or otherwise organized according specific ones of the resource interaction processors. Data filtering provides for removing datum that has minimal value and/or is captured from an untrusted data source. Further, data filtering serves to remove redundant data and/or data that have been manipulated in favor of the resource interaction processor (i.e., so-called padded data or the like).

At Event 830, a resource interaction processor rules and regulations database is accessed to retrieve internal and/or external rules and regulations applicable to the resource interaction processor undergoing modeling. Specifically, the internal and/or external rules and regulations that are retrieved are associated with the designated type (e.g., industry, sector or the like) of resource interaction processor.

At Event 840, a heuristics engine is implemented to generate a resource interaction processor model for the resource interaction processor based at least on the aggregated and filtered first data and the internal and/or external rules and regulations. The model indicates whether the resource interaction processor is a viable candidate for deploying resource interaction services. In specific embodiments of the method, the model may include or consist of a score, which is compared to a threshold service deployment score for determining whether the resource interaction processor is a viable candidate for service deployment.

At optional Event 850, in response to determining that the resource interaction processor is a viable candidate, resource interaction processor services are offered and/or deployed to the resource interaction processor.

Thus, present embodiments of the invention provide for multi-dimensional modeling of resource interaction processors for determining viability of deployment of resource interaction services. The system leverages data captured from various sources along with internal and external rules and regulations applicable to a resource interaction processor to determine whether the resource interaction processor meets requirements for resource interactions services. In the event that the resource interaction processor is determined to be viable, resource interactions services are deployed to the resource interaction processor.

The features, functions, and advantages that have been discussed may be achieved independently in various embodiments of the present invention or may be combined with yet other embodiments, further details of which can be seen with reference to the following description and drawings.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for multi-dimensional modeling of resource interaction processors, the system comprising:
a resource interaction processor rules database stored in a first memory and configured to store a plurality of internal and external rules and regulations data associated with a plurality of types of resource interaction processors;
a resource interaction processor analysis sub-system including a second memory, at least one first processor in communication with the second memory and first instructions that are stored in the second memory, executable by the at least one first processor and configured to:
capture, from a plurality of data sources, first data associated with a plurality of resource interaction processors,
aggregate the captured first data,
filter the captured and aggregated first data by analyzing a value of first datum in comparison to trust levels associated with each of the data sources and removing at least a portion of the first data determined to have the value below a predetermined one of the trust levels, and
determine, based on the aggregated and filtered first data, a location for each of the plurality of resource interaction processors; and
a model generating sub-system including a third memory, at least one second processor in communication with the third memory, and second instructions that are stored in the third memory, executable by the at least one second processor and configure to:
receive, from the resource interaction processor data analysis sub-system, aggregated and filtered first data associated with one of the plurality of resource interaction processors including the location for the one of the plurality of resource interaction processors,
access the resource interaction processor database to retrieve internal and external rules and regulations data associated with one of the plurality of resource interaction processors, wherein the external rules retrieved for the one of the plurality of resource interaction processors is based on the corresponding location of the resource interaction provider, and
implement a heuristics engine to determine, based at least on the retrieved internal and external rules and regulations data and the received aggregated and filtered first data, whether the one of the plurality of resource interaction processors is a viable candidate for deploying resource interaction processor services.

2. The system of claim 1, further comprising a services deployment sub-system including a fourth memory, at least one third processor in communication with the fourth memory, and third instructions that are stored in the fourth memory, executable by the at least one third processor and configured to:
in response to determining that the one of the plurality of resource interaction processors is the viable candidate, deploy one or more resource interaction processor services to the one of the plurality of resource interaction processors.

3. The system of claim 2, wherein the services deployment sub-system includes the third instruction further configured to deploy one or more resource interaction processor services including issuing resource interaction processing devices to the one of the plurality of resource interaction processors.

4. The system of claim 1, further comprising a data analysis sub-system including a fourth memory, at least one third processor in communication with the fourth memory and third instructions that are stored in the fourth memory, executable by the at least one third processor and configured to:
   capture, from the plurality of data sources, second data associated with a plurality of existing or potential resource interaction entities of the resource interaction processors,
   aggregate the captured second data, and
   filter the captured and aggregated second data by analyzing a value of second datum in comparison to trust levels associated with each of the data sources and removing at least a portion of the second data determined to have the value below a predetermined one of the trust levels.

5. The system of claim 4, wherein the model generating sub-system includes the second instructions further configured to:
   receive, from the data analysis sub-system, aggregated and filtered second data associated with at least one of the plurality of existing or potential resource interaction entities, and
   implement the heuristics engine to determine, based at least on the retrieved external rules and regulations data, and the received aggregated and filtered first and second data, whether the one of the plurality of resource interaction processors is a viable candidate for deploying resource interaction processor services.

6. The system of claim 1, further comprising a processor type data analysis sub-system including a fourth memory, at least one third processor in communication with the fourth memory and third instructions that are stored in the fourth memory, executable by the at least one third processor and configured to:
   capture, from the plurality of data sources, second data associated with one of a plurality of resource interaction processor types,
   aggregate the captured second data, and
   filter the captured and aggregated second data by analyzing a value of each second datum in comparison to trust levels associated with each of the data sources and removing at least a portion of the second data determined to have the value below a predetermined one of the trust levels.

7. The system of claim 6, wherein the model generating sub-system includes the second instructions further configured to:
   receive, from the processor type data analysis sub-system, aggregated and filtered second data associated with at least one of the pluralities of resource interaction processor types, and
   implement the heuristics engine to determine, based at least on the retrieved external rules and regulations data, and the received aggregated and filtered first and second data, whether the one of the plurality of resource interaction processors is a viable candidate for deploying resource interaction processor services.

8. The system of claim 1, further comprising a distributed trust computing network comprising a plurality of decentralized nodes, each decentralized node having a fourth memory and at least one third processor in communication with the fourth memory, wherein the fourth memory of the decentralized nodes is configured to store at least one distributed ledger, wherein the decentralized nodes are configured to act as source of truth in verifying an identity of each of the plurality of resource interaction processors.

9. A computer-implemented method for multi-dimensional modeling of resource interaction processors, the method is executed by one or more computing processor devices and comprises:
   capturing, from a plurality of data sources, first data associated with a plurality of resource interaction processors;
   aggregating and filtering the captured first data, wherein filtering includes analyzing a value of first datum in comparison to trust levels associated with each of the data sources and removing at least a portion of the first data determined to have the value below a predetermined one of the trust levels;
   determining, based on the aggregated and filtered first data, a location for each of the plurality of resource interaction processors;
   accessing a resource interaction processor database to retrieve internal and external rules and regulations data associated with one of the plurality of resource interaction processors wherein the external rules retrieved for the one of the plurality of resource interaction processors is based on the corresponding determined location of the resource interaction provider, and
   implementing a heuristics engine to determine, based at least on (i) the retrieved internal and external rules and regulations data and the (ii) aggregated and filtered first data, whether the one of the plurality of resource interaction processors is a viable candidate for deploying resource interaction processor services.

10. The computer-implemented method of claim 9, further comprising:
   in response to determining that the one of the plurality of resource interaction processors is the viable candidate, deploying one or more resource interaction processor services to the one of the plurality of resource interaction processors.

11. The computer-implemented method of claim 9, further comprising:
   capturing, from the plurality of data sources, second data associated with a plurality of existing or potential resource interaction entities configured to perform resource interactions at the resource interaction processors;
   aggregating and filtering the captured second data, wherein filtering includes analyzing a value of second datum in comparison to trust levels associated with each of the data sources and removing at least a portion of the second data determined to have the value below a predetermined one of the trust levels,
   wherein implementing further comprises:
   implementing the heuristics engine to determine, based at least on the (i) retrieved external rules and regulations data, and (ii) the aggregated and filtered first data, and (iii) the aggregated and filtered second data, whether the one of the plurality of resource interaction processors is a viable candidate for deploying resource interaction processor services.

12. The computer-implemented method of claim 9, further comprising:
   capturing, from the plurality of data sources, second data associated with one of a plurality of resource interaction processor types;

aggregating and filtering the captured second data, wherein filtering includes analyzing a value of each second datum in comparison to trust levels associated with each of the data sources and removing at least a portion of the second data determined to have the value below a predetermined one of the trust levels, and wherein implementing further comprises:

implementing the heuristics engine to determine, based at least on the (i) retrieved external rules and regulations data, (ii) the aggregated and filtered first data, and (iii) the aggregated and filtered second data, whether the one of the plurality of resource interaction processors is a viable candidate for deploying resource interaction processor services.

13. The computer-implemented method of claim 9, further comprising:

verifying, via convergence of a plurality of nodes within a distributed trust computing network, an identity of each of the plurality of resource interaction processors.

14. A computer program product comprising:

a non-transitory computer-readable medium comprising:

a first set of codes for causing a computer to capture, from a plurality of data sources, first data associated with a plurality of resource interaction processors;

a second set of codes for causing a computer to aggregate and filter the captured first data, wherein filtering includes analyzing a value of first datum in comparison to trust levels associated with each of the data sources and removing at least a portion of the first data determined to have the value below a predetermined one of the trust levels;

a third set of codes for causing a computer to determine, based on the aggregated and filtered first data, a location for each of the plurality of resource interaction processors;

a fourth set of codes for causing a computer to access a resource interaction processor database to retrieve internal and external rules and regulations data associated with one of the plurality of resource interaction processors, wherein the external rules retrieved for the one of the plurality of resource interaction processors is based on the corresponding determined location of the resource interaction provider; and a fifth set of codes for causing a computer to implement a heuristics engine to determine, based at least on (i) the retrieved internal and external rules and regulations data and the (ii) aggregated and filtered first data, whether the one of the plurality of resource interaction processors is a viable candidate for deploying resource interaction processor services.

15. The computer program product of claim 14, further comprising:

a sixth set of codes for causing a computer to in response to determining that the one of the plurality of resource interaction processors is the viable candidate, deploying one or more resource interaction processor services to the one of the plurality of resource interaction processors.

16. The computer program product of claim 14, wherein:

the first set of codes is further configured to cause the computer to capture, from the plurality of data sources, second data associated with a plurality of existing or potential resource interaction entities configured to perform resource interactions at the resource interaction processors, the second set of codes is further configured to cause the computer to aggregate and filter the captured second data, wherein filtering includes analyzing a value of second datum in comparison to trust levels associated with each of the data sources and removing at least a portion of the second data determined to have the value below a predetermined one of the trust levels, and the fifth set of codes is further configured to cause the computer to implement the heuristics engine to determine, based at least on the (i) retrieved external rules and regulations data, and (ii) the aggregated and filtered first data, and (iii) the aggregated and filtered second data, whether the one of the plurality of resource interaction processors is a viable candidate for deploying resource interaction processor services.

\* \* \* \* \*